US008897436B2

(12) United States Patent
Croak et al.

(10) Patent No.: US 8,897,436 B2
(45) Date of Patent: *Nov. 25, 2014

(54) METHOD AND APPARATUS FOR PROVIDING EMERGENCY RING TONES FOR URGENT CALLS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 869 days.

This patent is subject to a terminal disclaimer.

(21) Appl. No.: 12/647,478

(22) Filed: Dec. 26, 2009

(65) Prior Publication Data

US 2010/0098065 A1 Apr. 22, 2010

Related U.S. Application Data

(63) Continuation of application No. 11/234,924, filed on Sep. 26, 2005, now Pat. No. 7,664,237.

(51) Int. Cl.
| H04M 3/42 | (2006.01) |
| H04M 11/04 | (2006.01) |
| H04M 1/00 | (2006.01) |
| H04M 19/04 | (2006.01) |
| H04M 1/725 | (2006.01) |

(52) U.S. Cl.
CPC .......... *H04M 19/04* (2013.01); *H04M 1/72536* (2013.01)
USPC .......................... 379/207.16; 379/37; 379/252

(58) Field of Classification Search
USPC ..................................................... 379/207.16
See application file for complete search history.

(56) References Cited

U.S. PATENT DOCUMENTS

| 5,825,867 | A | * | 10/1998 | Epler et al. | ............... 379/215.01 |
| 5,905,774 | A | * | 5/1999 | Tatchell et al. | ............ 379/88.04 |
| 6,650,746 | B1 | * | 11/2003 | Groen et al. | ............. 379/207.16 |
| 7,333,496 | B1 | | 2/2008 | Patel et al. | |
| 7,664,237 | B1 | * | 2/2010 | Croak et al. | ............... 379/90.01 |
| 8,000,751 | B2 | * | 8/2011 | Saranu et al. | .................. 455/567 |
| 2006/0045252 | A1 | * | 3/2006 | Gorti et al. | ............... 379/201.02 |
| 2007/0286402 | A1 | | 12/2007 | Jacobson | |

* cited by examiner

*Primary Examiner* — Joseph T Phan

(57) ABSTRACT

A method and apparatus for enabling calling parties to request the VoIP network to provide a special ring tone to be signaled as the occurrence of an urgent call to called parties are disclosed. Alternatively, a high frequency intercept tone or call waiting tone is also provided when the called parties are already engaged in conversation when an urgent call is incoming.

20 Claims, 4 Drawing Sheets

METHOD AND APPARATUS FOR PROVIDING EMERGENCY RING TONES FOR URGENT CALLS

This application is a continuation of U.S. patent application Ser. No. 11/234,924, filed Sep. 26, 2005, now U.S. Pat. No. 7,664,237 which is currently allowed and is herein incorporated by reference in its entirety.

The present invention relates generally to communication networks and, more particularly, to a method and apparatus for providing emergency ring tones for urgent calls in communication networks, e.g., packet networks such as Voice over Internet Protocol (VoIP) networks.

BACKGROUND OF THE INVENTION

The necessity of communicating with someone on a real-time basis varies as a function of the urgency of the communication. Frequently, calling parties are often content to leave a voice mail message for someone or the called parties will often let calls be redirected to voice mail if they are busy or do not want to be disturbed. Occasionally, calls are of an urgent nature and need to be attended to on an immediate basis.

Therefore, a need exists for a method and apparatus for providing emergency ring tones for urgent calls in a packet network, e.g., a VoIP network.

SUMMARY OF THE INVENTION

In one embodiment, the present invention enables calling parties to request the packet network, e.g., a VoIP network to provide a special ring tone to be signaled as the occurrence of an urgent call to called parties. Alternatively, a special high frequency intercept tone or call waiting tone is also provided when called parties are already engaged in conversation when an urgent call is incoming.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
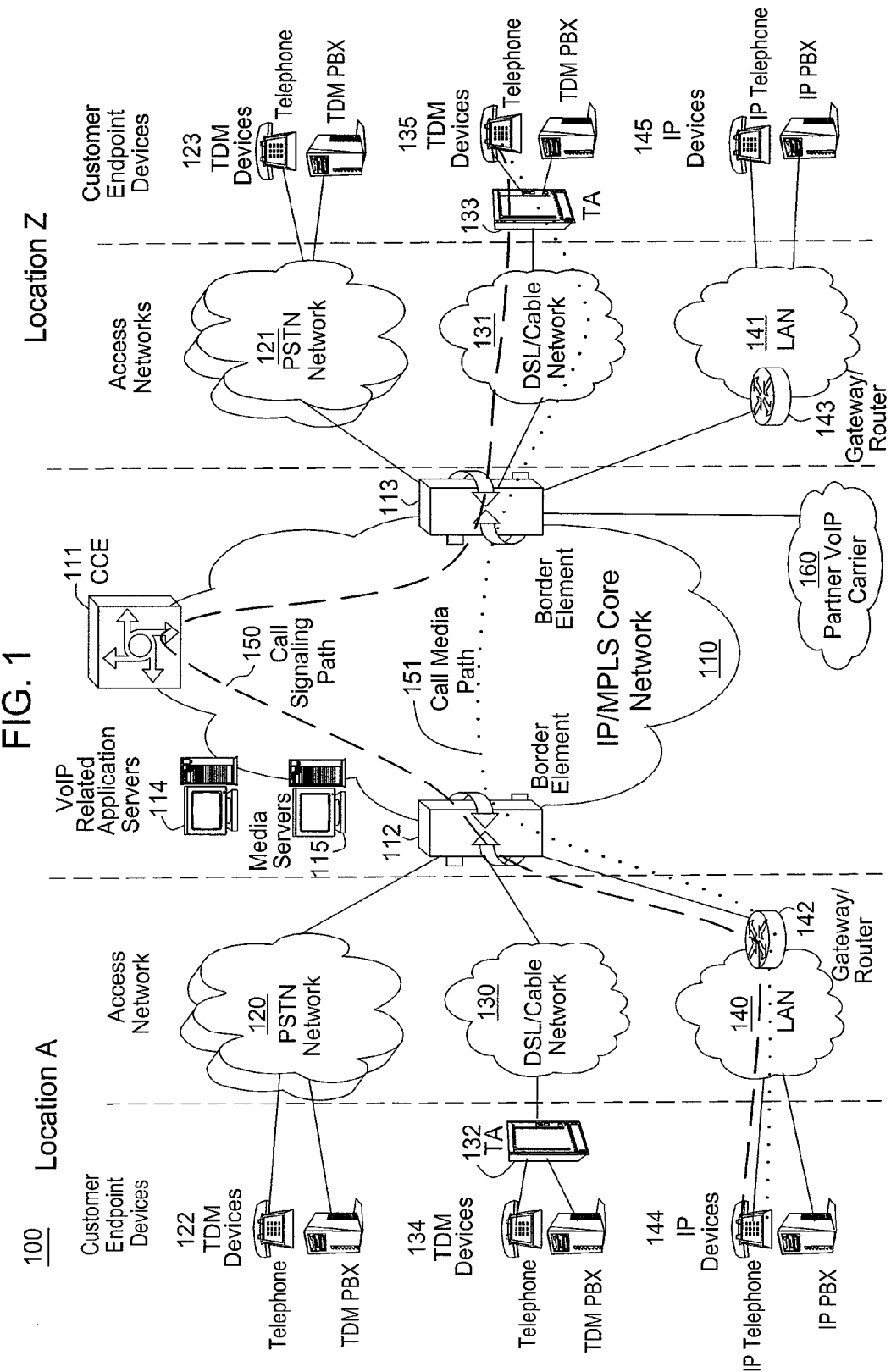
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The necessity of communicating with someone on a real-time basis varies as a function of the urgency of the communication. Frequently, calling parties are often content to leave a voice mail message for someone or the called parties will often let calls be redirected to voice mail if they are busy or do not want to be disturbed. Occasionally, calls are of an urgent nature and need to be attended to on an immediate basis.

To address this need, the present invention enables calling parties to request the packet network, e.g., a VoIP network to provide a special ring tone to be signaled as the occurrence of an urgent call to called parties. Alternatively, a special high frequency intercept tone or call waiting tone is also provided when called parties are already engaged in conversation when an urgent call is incoming.

Figure 2:
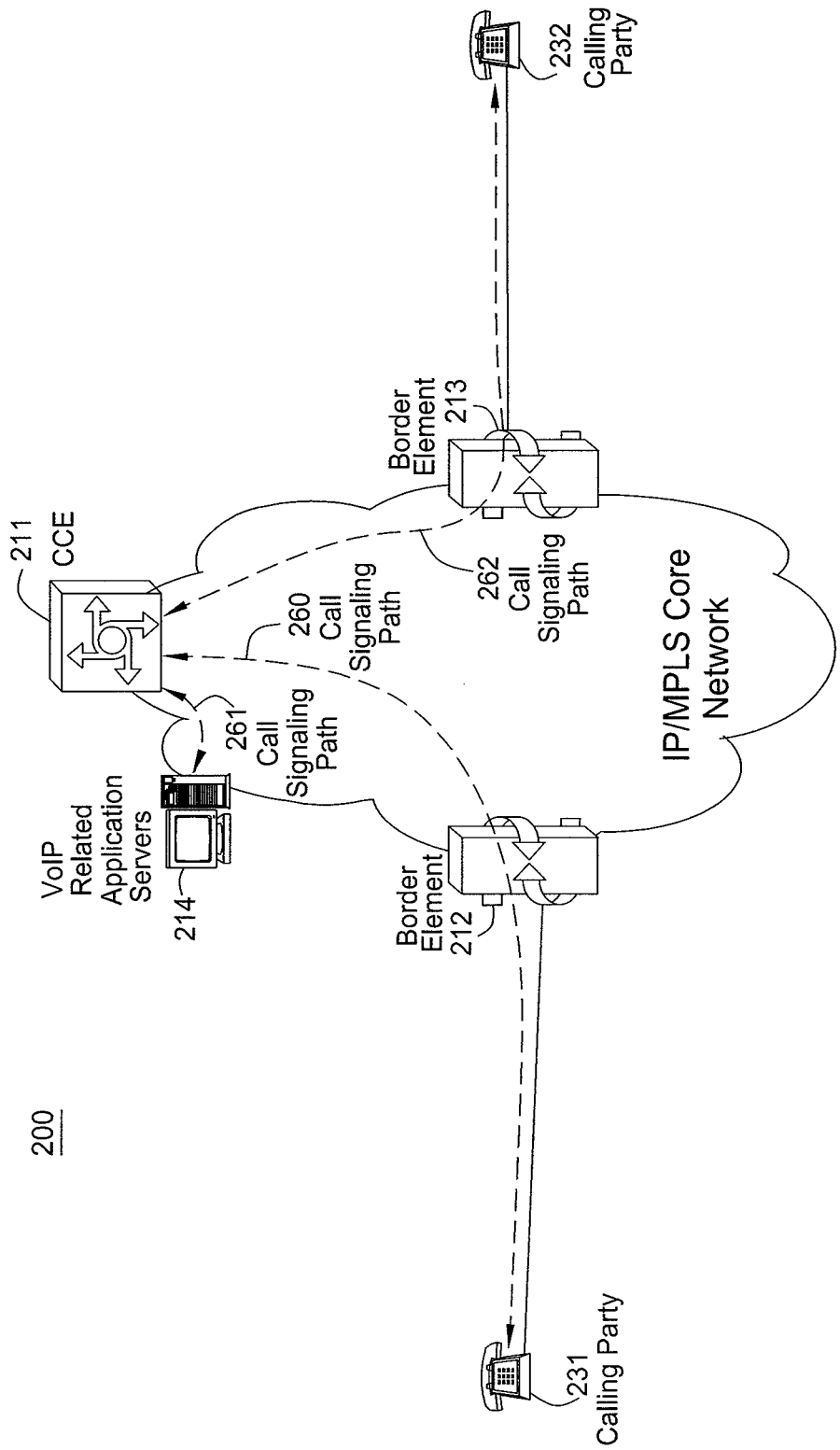
FIG. 2 illustrates an example of enabling emergency ring tones for urgent calls in a VoIP network of the present invention.

FIG. 2 illustrates an exemplary communication architecture 200 for enabling emergency ring tones for urgent calls in a packet network, e.g., a VoIP network of the present invention. In FIG. 2, calling party 231 is a registered subscriber of the emergency ring tone service feature to send and/or receive emergency ring tones and called party 232 is a registered subscriber of the emergency ring tone service feature to receive and/or send emergency ring tones. Calling party 231 registers with the network provider a list of registered phone numbers to which emergency ring tones can be sent. Called party 232 registers with the network provider a list of registered phone numbers from which emergency ring tones can be received.

For example, calling party 231 makes a call to calling party 232 using the emergency ring tone service feature using signaling path 260 via BE 212. The service feature can be enabled by calling party 231 by entering a predefined DTMF signal before dialing the phone number of called party 232. Upon receiving the call setup message with an indication of sending an emergency ring tone from calling party 231 to called party 232, CCE 211 communicates with AS 214 using signaling path 261 to verify that calling party 231 is a valid subscriber to send emergency ring tone and called party 232 is a valid subscriber to receive emergency ring tone. In addition, AS 214 verifies that the phone number of called party 232 is on the calling party 231 registered list of phone number to which emergency ring tone can be sent and that the phone number of calling party 231 is on the called party 232 registered list of phone number from which emergency ring tone can be received.

In one embodiment, called party 232 is engaged in another call at the moment, CCE 211 sends the call setup message with the emergency call waiting tone to called party 232 using signaling path 262 via BE 213. Upon receiving the emergency call waiting tone, called party 232 decides to disengage the existing call to answer the call from calling party 231. In another embodiment, called party 232 is screening incoming calls and CCE 211 sends an emergency ring tone to called party 232 using signaling path 262. Upon receiving an incoming call with an emergency ring tone, called party 232 decides to answer the incoming call from calling party 231.

Note that if the calling party is a registered subscriber of the emergency ring tone service feature but the called party is not a registered emergency ring tone subscriber, the called party will simply receive a regular ring tone instead. If the calling party is a registered subscriber of the emergency ring tone service feature and the called party is a registered subscriber of the emergency ring tone service feature but the called party phone number is not on the calling party registered list of phone numbers to which an emergency ring tone can be sent, the called party will simply receive a regular ring tone instead. If the calling party is a registered subscriber of the emergency ring tone service feature and the called party is a registered subscriber of the emergency ring tone service feature but the calling party phone number is not on the called party registered list of phone numbers from which an emergency ring tone can be received, the called party will simply receive a regular ring tone instead. In addition, the calling party who is a registered subscriber of the emergency ring tone service feature can set the registered number list such that an emergency ring tone can be sent to all called parties. Similarly, the called party who is a registered subscriber of the emergency ring tone service feature can set the registered number list such that an emergency ring tone can be received from all calling parties.

Figure 3:
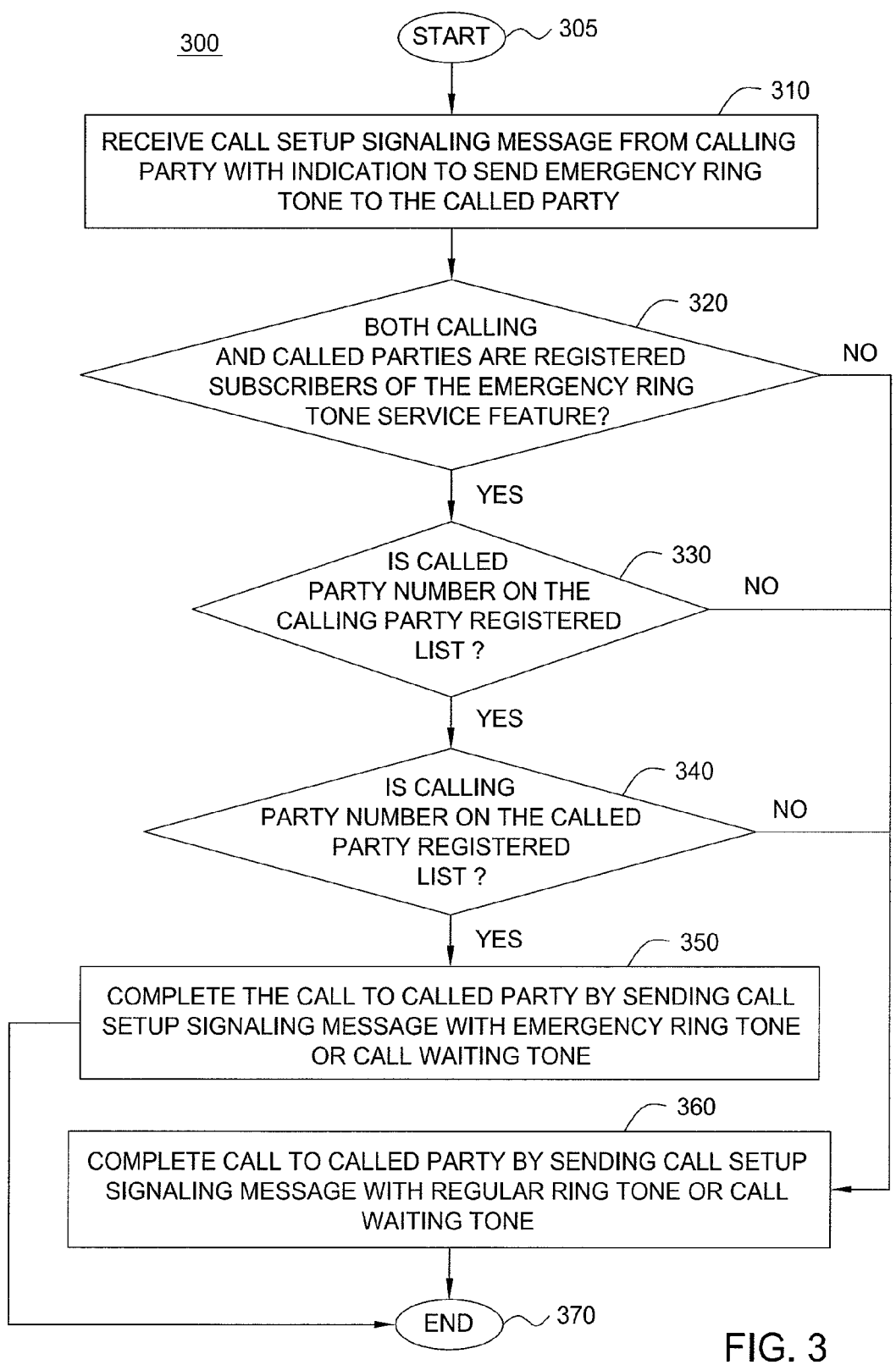
FIG. 3 illustrates a flowchart of a method for enabling emergency ring tones for urgent calls in a VoIP network of the present invention.

FIG. 3 illustrates a flowchart of a method 300 for enabling emergency ring tones for urgent calls in a packet network, e.g., a VoIP network of the present invention. Method 300 starts in step 305 and proceeds to step 310.

In step 310, the method receives a call setup signaling message with an indication to send an emergency ring tone to a called party from a calling party.

In step 320, the method checks if both the calling and the called parties subscribe to the emergency ring tone service feature. If both the calling and the called parties subscribe to the emergency ring tone service feature, the method proceeds to step 330; otherwise, the method proceeds to step 360.

In step 330, the method checks if the called party phone number is on the calling party's registered list of phone numbers to which an emergency ring tone can be sent. If the called party phone number is on the calling party's registered list, the method proceeds to step 340; otherwise, the method proceeds to step 360.

In step 340, the method checks if the calling party phone number is on the called party's registered list of phone numbers from which an emergency ring tone can be received. If the calling party phone number is on the called party registered list, the method proceeds to step 350; otherwise, the method proceeds to step 360.

In step 350, the method completes the call to the called party by forwarding the call setup message with an emergency ring tone if the phone line of the called party is not busy or with an emergency call waiting tone if the phone line of the called party is busy.

In step 360, the method completes the call to the called party by forwarding the call setup message with a regular ring tone or a regular call waiting tone. The method ends in step 370.

It should be noted that steps 330 and 340 may be optional steps in one embodiment of the present invention. Namely, if both parties are subscribers to the emergency ring tone service feature, then the emergency tone can be sent on that basis alone.

Figure 4:
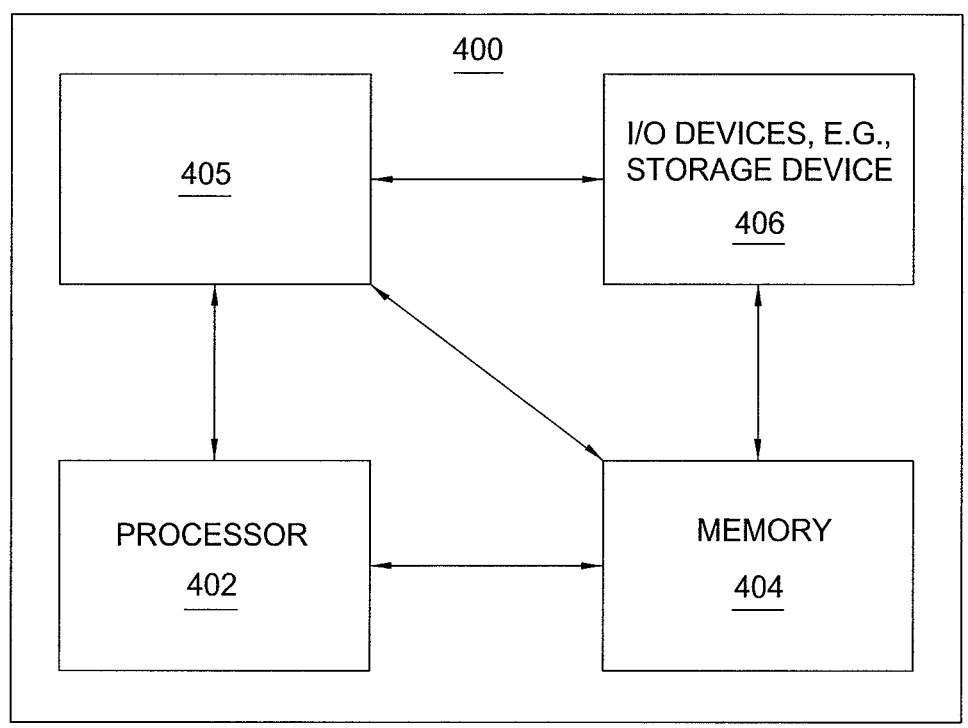
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an emergency ring tone for urgent call module 405, and various input/output devices 406 (e.g., storage devices, including but not limited to, a tape drive a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present emergency ring tone for urgent call module or process 405 can be loaded into memory 404 and executed by processor 402 to implement the functions as discussed above. As such, the present emergency ring tone for urgent call process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an emergency ring tone in a communication network, comprising:
   receiving, by a processor, a call setup signaling message from a calling party requesting the emergency ring tone to be sent to a called party, where the emergency ring tone is provided in accordance with an emergency ring tone service feature; and
   providing, by the processor, the emergency ring tone to the called party, wherein the providing comprises verifying that both the calling party and the called party are registered subscribers of the emergency ring tone service feature and sending the emergency ring tone to the called party, wherein each of the calling party and the called party has registered for a subscription to the emergency ring tone service feature via an application server in the communication network of a service provider before the call setup signaling message is received, wherein the providing further comprises checking that a registered emergency ring tone list of the calling party is set where the emergency ring tone is capable of being sent to all called parties and checking that a registered emergency ring tone list of the called party is set where the emergency ring tone is capable of being received from all calling parties.

2. The method of claim 1, wherein the communication network comprises a packet network.

3. The method of claim 2, wherein the packet network comprises a voice over internet protocol network.

4. The method of claim 1, wherein the verifying is performed by the application server.

5. The method of claim 1, wherein the sending is performed by the processor of a call control element.

6. The method of claim 1, wherein the emergency ring tone comprises a predefined ring tone when a phone line of the called party is not busy and a predefined call waiting tone when the phone line of the called party is engaged.

7. A non-transitory computer-readable medium storing a plurality of instructions, which when executed by a processor, cause the processor to perform operations for providing an emergency ring tone in a communication network, the operations comprising:
   receiving a call setup signaling message from a calling party requesting the emergency ring tone to be sent to a called party, where the emergency ring tone is provided in accordance with an emergency ring tone service feature; and
   providing the emergency ring tone to the called party, wherein the providing comprises verifying that both the calling party and the called party are registered subscribers of the emergency ring tone service feature and sending the emergency ring tone to the called party, wherein each of the calling party and the called party has registered for a subscription to the emergency ring tone service feature via an application server in the communication network of a service provider before the call setup signaling message is received, wherein the providing further comprises checking that a registered emergency ring tone list of the calling party is set where the emergency ring tone is capable of being sent to all called parties and checking that a registered emergency ring tone list of the called party is set where the emergency ring tone is capable of being received from all calling parties.

8. The non-transitory computer-readable medium of claim 7, wherein the communication network comprises a packet network.

9. The non-transitory computer-readable medium of claim 8, wherein the packet network comprises a voice over internet protocol network.

10. The non-transitory computer-readable medium of claim 7, wherein the verifying is performed by the application server.

11. The non-transitory computer-readable medium of claim 7, wherein the sending is performed by the processor of a call control element.

12. The non-transitory computer-readable medium of claim 7, wherein the emergency ring tone comprises a predefined ring tone when a phone line of the called party is not busy and a predefined call waiting tone when the phone line of the called party is engaged.

13. An apparatus for providing an emergency ring tone in a communication network, comprising:
    a processor; and
    a computer-readable medium storing a plurality of instructions, which when executed by the processor, cause the processor to perform operations, the operations comprising:
        receiving a call setup signaling message from a calling party requesting the emergency ring tone to be sent to a called party, where the emergency ring tone is provided in accordance with an emergency ring tone service feature; and
        providing the emergency ring tone to the called party, wherein the providing comprises verifying that both the calling party and the called party are registered subscribers of the emergency ring tone service feature and sending the emergency ring tone to the called party, wherein each of the calling party and the called party has registered for a subscription to the emergency ring tone service feature via an application server in the communication network of a service provider before the call setup signaling message is received, wherein the providing further comprises checking that a registered emergency ring tone list of the calling party is set where the emergency ring tone is capable of being sent to all called parties and checking that a registered emergency ring tone list of the called party is set where the emergency ring tone is capable of being received from all calling parties.

14. The apparatus of claim 13, wherein the communication network comprises a packet network.

15. The apparatus of claim 14, wherein the packet network comprises a voice over internet protocol network.

16. The apparatus of claim 13, wherein the verifying comprises interacting with the application server, wherein the application server is operative for verifying that both the calling party and the called party are registered subscribers of the emergency ring tone service feature.

17. The apparatus of claim 13, wherein the sending is performed by the processor deployed in a call control element.

18. The apparatus of claim 13, wherein the emergency ring tone comprises a predefined ring tone when a phone line of the called party is not busy and a predefined call waiting tone when the phone line of the called party is engaged.

19. The method of claim 2, wherein the packet network comprises a service over internet protocol network.

20. The non-transitory computer-readable medium of claim 8, wherein the packet network comprises a service over internet protocol network.

* * * * *